United States Patent [19]
Kuwahara

[11] Patent Number: 5,819,590
[45] Date of Patent: Oct. 13, 1998

[54] MANUAL TRANSMISSION GEAR SHIFT MECHANISM

[75] Inventor: Wataru Kuwahara, Hatsukaichi, Japan

[73] Assignee: Mazda Motor Corporation, Hiroshima, Japan

[21] Appl. No.: 831,706

[22] Filed: Apr. 10, 1997

Related U.S. Application Data

[63] Continuation of Ser. No. 186,520, Jan. 26, 1994, abandoned.

[30] Foreign Application Priority Data

Jan. 27, 1993 [JP] Japan ..................................... 5-011452
Jan. 27, 1993 [JP] Japan ..................................... 5-011453

[51] Int. Cl.⁶ ....................................................... F16H 5/00
[52] U.S. Cl. .............................. 74/473 R; 74/477; 74/335
[58] Field of Search ................................. 74/473 R, 477, 74/335

[56] References Cited

U.S. PATENT DOCUMENTS

| | | | |
|---|---|---|---|
| 3,431,791 | 3/1969 | Labat | 74/477 |
| 3,731,554 | 5/1973 | Renk | 74/477 |
| 4,222,281 | 9/1980 | Mylenek | 74/477 |
| 4,359,910 | 11/1982 | Numazawa et al. | 74/477 |
| 4,852,421 | 8/1989 | Kerboul | 74/477 |
| 4,920,815 | 5/1990 | Reynolds | 74/335 |
| 5,052,238 | 10/1991 | Sewell | 74/473 R |
| 5,085,095 | 2/1992 | Lasoen | 74/335 |
| 5,105,674 | 4/1992 | Rea et al. | 74/473 R |
| 5,285,694 | 2/1994 | Chene | 74/473 R |
| 5,363,715 | 11/1994 | Huggins et al. | 74/473 R |

FOREIGN PATENT DOCUMENTS 57-6157  1/1982  Japan ........................................ 74/476

*Primary Examiner*—Charles A. Marmor
*Assistant Examiner*—David M. Fenstermacher
*Attorney, Agent, or Firm*—Martin Fleit

[57] ABSTRACT

A manual transmission gear shift mechanism has a plurality of shift rods, each of which is provided with a shift fork and at least two of which are coaxially disposed, a control rod having at least two select arms which selectively engage with the shift rods, and a shift lever for sliding the control rod so as to place the transmission into any one of a plurality of gears. The select arms are disposed on the control rod either at specified axial separations along an axis of rotation of the control rod or at specified angular separations around an axis of rotation of the control rod.

16 Claims, 8 Drawing Sheets ly, most manual transmissions used in automobiles
MANUAL TRANSMISSION GEAR SHIFT MECHANISM This is a continuation of application Ser. No. 08/186,520, filed Jan. 26, 1994, abandoned.

BACKGROUND OF THE INVENTION

1. Field of the Invention

The present invention relates to a manual gear shift mechanism for a transmission for manually placing the transmission into any desired gear.

2. Description of the Related Art

Typically, most manual transmissions used in automobiles and other automotive vehicles are equipped with a five speed transmission including first to fourth forward gears and a reverse gear. In recent years, six-speed transmissions have been developed, in which a sixth gear is provided having a higher gear ratio than that of the usual overdrive gear with an attempt to improve fuel consumption for higher speed driving. Such a six-speed transmission is known from, for example, U.S. Pat. No. 5,052,238.

With this prior art six-speed manual transmission, as with the prior art five-speed manual transmission, there is provided a control rod disposed parallel to a plurality of shift rods having individual shift forks. By laterally moving a shift lever, the control rod rotates around its axis so as to bring a selector lever attached to the control rod into selective engagement with one of the shift rods. By moving the shift lever back and forth longitudinally, while the control rod is engaged with one of the shift rods, the shift fork attached to the selected shift rod is moved back and forth in the direction of the vehicle length so as to select a desired gear.

However, ordinarily, since such a manual gear shift mechanism is configured such that each shift rod selects gears in two steps through its forward and backward motion, three shift rods are necessary for the conventional five-speed transmission. Similarly, the conventional six-speed transmissions require four shift rods. Arrangement of these shift rods axially across the transmission casing causes an increase in the width of the transmission, requiring an overall increase in the size of the transmission. Furthermore, the select lever has to turn through a large angle.

SUMMARY OF THE INVENTION

It is an objective of the present invention to provide a transmission shift mechanism for transmissions having more than six shiftable gears in which an increase in the overall size of the transmission is avoided.

It is another object of the present invention to provide a transmission shift mechanism for a transmission in which a decrease in the operative angle of a control rod is provided and a greater flexibility is afforded with regard to the layout of shift rods.

In order to accomplish these objectives of the present invention, a manual transmission gear shift mechanism has a plurality of shift rods, each shift rod being provided with a shift fork, a control rod selectively engageable with the shift rods, and a shift lever for sliding the control rod so as to place the transmission into any one of a plurality of gears. The control rod has at least two select arms engageable with the shift rods. Specifically, at least two of the shift rods are coaxially disposed. The select arms may be disposed on the control rod either at specified axial separations along an axis of rotation of the control rod or at specified angular separations around an axis of rotation of the control rod.

Since the manual transmission gear shift mechanism of this invention is accomplished through the coaxial arrangement of at least two of a plurality of shift rods, the enlargement of the transmission which would be necessitated by the placement of the shift rods across the width of the transmission can be avoided. Moreover, with six or more speed transmissions, since a greater number of gear sets is required than with five speed transmissions, the length of the transmission is necessarily increased. However, coaxially arranging at least two shift rods makes efficient utilization of the lengthwise dead space created in the transmission, avoiding a greater enlargement of the transmission.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENT

Figure 1:
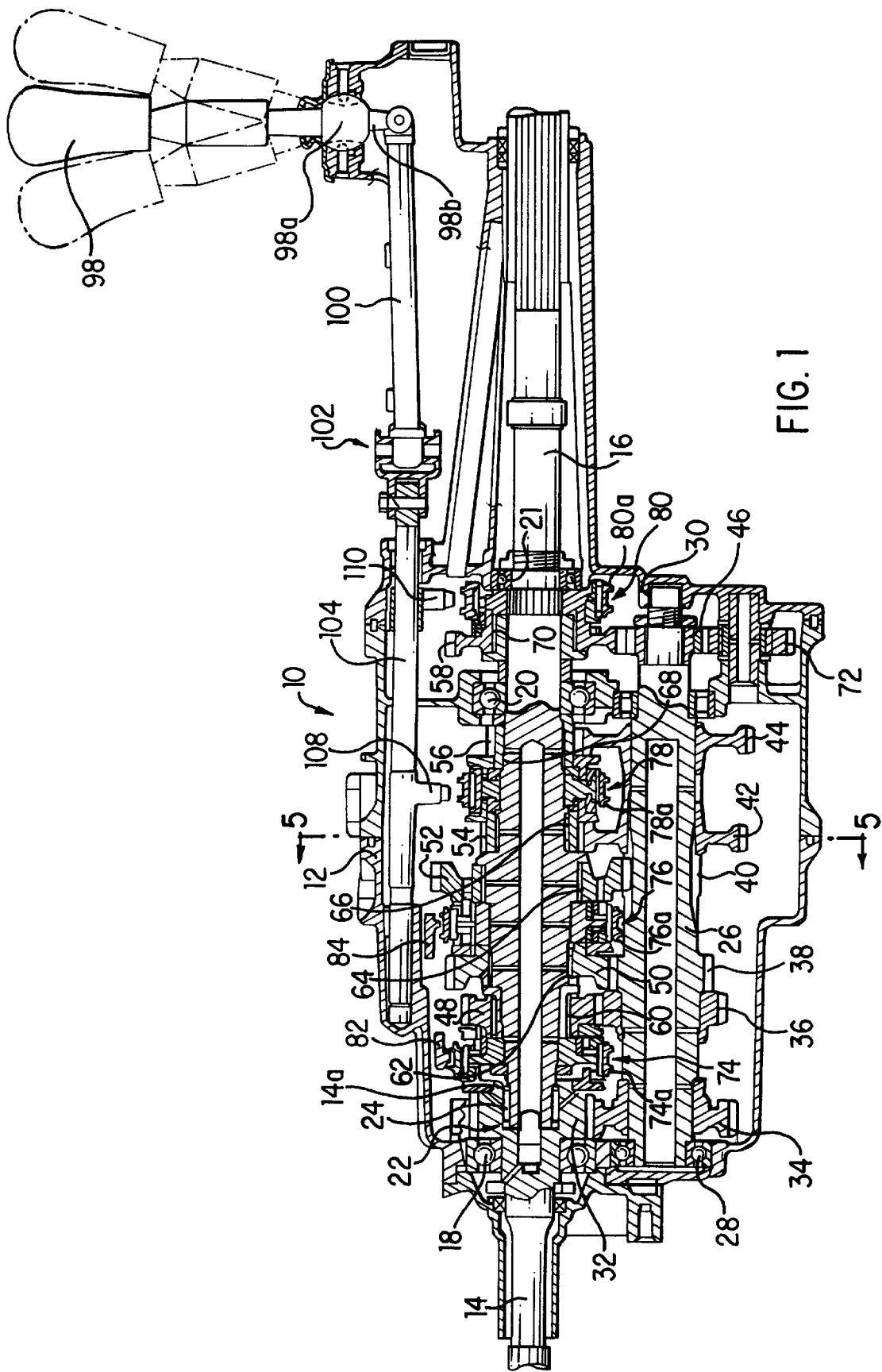
FIG. 1 is a longitudinal cross-sectional view showing the construction of a manual transmission in which a gear shift mechanism in accordance with a preferred embodiment of the present invention is installed.

Referring to the drawings in detail and, in particular, to FIG. 1, a manual shift transmission 10, having a gear shift mechanism in accordance with a preferred embodiment of the present invention, is shown. The transmission is of a 6 speed manual shift type and used in a front-engine rear-drive (FR) car. This transmission is placed in the car such that the left side as viewed in FIG. 1 is positioned toward the front of the car body and the right side is positioned toward the rear of the car body. The transmission 10 has an input shaft 14 disposed in the front portion of a housing 12, forming the outline of the transmission 10, and an output shaft 16 disposed coaxially with the input shaft in the rear portion of the housing 12. The input shaft 14 is connected to an engine output shaft through a clutch (not shown), and the output shaft 16 is connected to a differential for rear wheels through a propeller shaft (not shown).

The input shaft 14 is supported for rotation by a bearing 18 located at the front end of the housing 12, and the output shaft 16 is supported for rotation by a pair of bearings 20 and 21 located at the rear end of the housing 12. The input shaft 14 and the output shaft 16 are connected by a needle bearing 24 at their joint position 22, located just behind the bearing 18 so as to rotate relative to each other and to rotate independently from each other with respect to the housing 12. In a position adjacent to the input shaft 14 and the output shaft 16, there is disposed a counter shaft 26 with its axis of rotation placed in parallel to the axes of rotation of the input shaft 14 and the output shaft 16. This counter shaft 26 is supported by a bearing 28 and a needle bearing 30 for rotation with respect to the housing 12. The input shaft 14 and the counter shaft 26 are, respectively, provided with gears 32 and 34, in engagement with each other, through which rotation of the input shaft 14 is always transmitted to the counter shaft 26.

On the counter shaft 26, in order from the left side as viewed in FIG. 1, are mounted a third (3rd) counter gear 36, a second (2nd) counter gear 38, a first (1st) counter gear 40, a fifth (5th) counter gear 42, a sixth (6th) counter gear 44, and a reverse counter gear 46. All of these counter gears 36, 38, 40, 42, 44 and 46 are fixedly mounted on the counter shaft 26 so as to rotate simultaneously with the counter shaft 26. On the other hand, on the output shaft 16, there are mounted a third (3rd) output gear 48, a second (2nd) output gear 50, a first (1st) output gear 52, a fifth (5th) output gear 54, a sixth (6th) output gear 56 and a reverse output gear 58 in order from the left side as viewed in FIG. 1. All of these output gears 48, 50, 52, 54, 56 and 58 are mounted for relative rotation with respect to the output shaft 16 through needle bearings 60, 62, 64, 66, 68 and 70, respectively. All these output and counter gears mounted on the output shaft 16 and the counter shaft 26 are always directly engaged between the third (3rd) gears 36 and 48, the second (2nd) gears 38 and 50, the first (1st) gears 40 and 52, the fifth (5th) gears 38 and 54, and the sixth (6th) gears 44 and 56. However, the reverse gears 46 and 58 are engaged with each other through an idle gear 72.

Between the right side end 14a of the input shaft end 14 and the 3rd gear 48, there is displaced a 3rd–4th gear synchronizer 74 which synchronizes the rotation of the input shaft 14 with the rotation of the output shaft 16 (when the input shaft 14 and the output shaft 16 are synchronized in rotation, the transmission provides the 4th gear) and also synchronizes the rotation of the 3rd counter gear 48 with the rotation of the output shaft 16. In addition, between the 2nd output gear 50 and the 1st output gear 52, there is displaced a 1st–2nd gear synchronizer 76 which synchronizes the rotation of both 2nd output gear 50 and 1st output gear 52 with the rotation of the output shaft 16. Further, between the 5th output gear 54 and the 6th output gear 56, there is displaced a 5th–6th gear synchronizer 78 which synchronizes the rotation of both 5th and 6th output gears 54 and 56 with the rotation of the output shaft 16. Furthermore, on the reverse output gear 58 located on the right side as viewed in FIG. 1, there is displaced a reverse gear synchronizer 80 which synchronizes the rotation of the reverse output gear 58 with the rotation of the output shaft 16.

Figure 2:
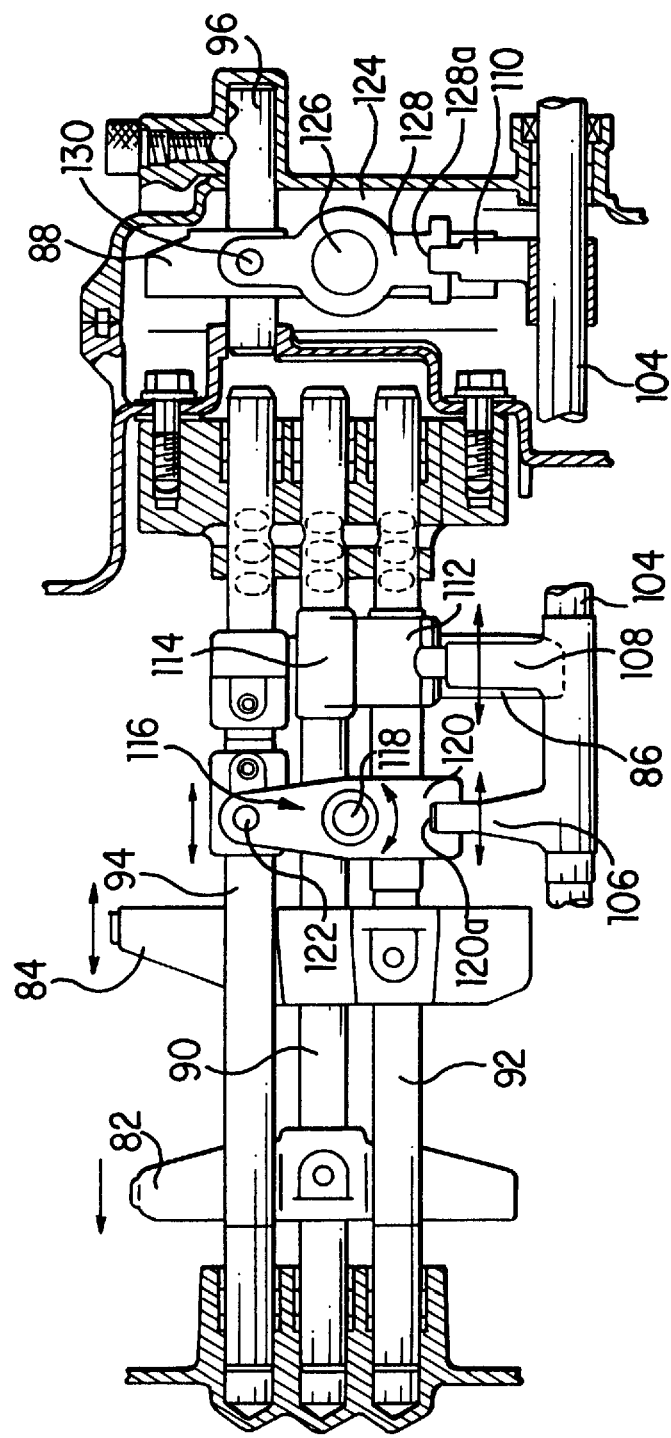
FIG. 2 is a longitudinal cross-sectional view showing the construction of the manual transmission of FIG. 1 as viewed from above.

Referring to FIG. 2 in conjunction with FIG. 1, a coupling sleeve 74a for the 3rd–4th gear synchronizer 74 is engaged with a 3rd–4th shift fork 82, and a coupling sleeve 76a for the 1st–2nd gear synchronizer 76 is engaged with a 1st–2nd shift fork 84. In addition, a coupling sleeve 78a for the 5th–6th gear synchronizer 78 is engaged with a 5th–6th shift fork 86. Further, a coupling sleeve 80a for the reverse gear synchronizer 80 is engaged with a reverse shift fork 88. The 3rd–4th shift fork 82 is attached to a 3rd–4th gear shift rod 90; the 1st–2nd shift fork 84 is attached to a 1st–2nd gear shift rod 92; the 5th–6th shift fork 86 is attached to a 5th–6th gear shift rod 94. These 3rd–4th, 1st–2nd and 5th–6th gear shift rod 90, 92 and 94 are laid out across the width of the upper portion of transmission 10 and arranged in parallel to a control rod 104, which will be described in detail hereafter, so as to slide along the length of the transmission 10 from the front toward the rear of the car. In addition, the reverse shift fork 88 is attached to a reverse shift rod 96 arranged behind and coaxially with the 5th–6th gear shift rod 94. Through sliding of these shift rods 90, 92, 94 and 96 in the direction from the front toward the back of the car, which is lateral as viewed in FIG. 2, each of the shift forks moves forward and backward relative to the lengthwise direction of the car and is accompanied by forward and backward movement of the respective coupling sleeves 74a, 76a, 78a and 80a and the synchronizers 74, 76, 78 and 80.

In this instance, the reverse shift rod 96 may be arranged in juxtaposition with the 3rd–4th gear shift rod 90, the 1st–2nd gear shift rod 92 and the 5th–6th gear shift rod 94. In such a case, the four shift rods are displaced side by side across the width of the transmission, which typically is one cause of the transmission being enlarged in width. For this reason, in the present embodiment, this drawback is prevented by displacing the reverse shift rod 96 behind the 5th–6th gear shift rod 94. Particularly, for the six speed manual shift transmission, since the number of gear sets distributed on the output shaft 16 and the counter shaft 26 is increased by one set more than in five speed manual shift transmissions, the length of the transmission is also necessarily increased. Hence, the displacement of the reverse shift rod 96 to the rear of the 5th–6th gear shift rod 94 is effectively accomplished by using a dead space created through the extension of the length of the transmission, which constitutes an improvement from the standpoint of space utilization.

Figure 3:
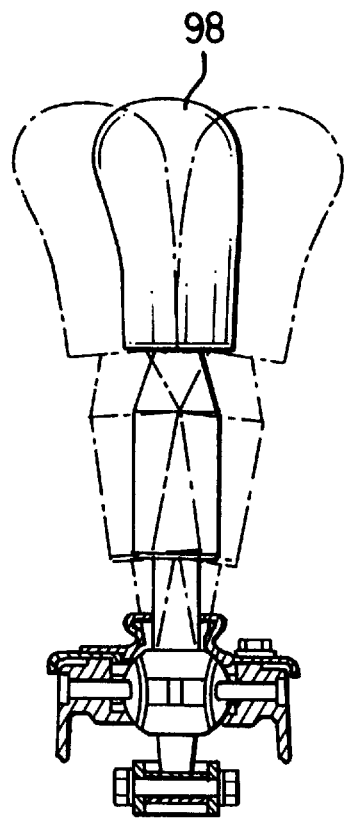
FIG. 3 is a rear view of a shift lever as viewed from the rear of the vehicle.

On the other hand, at the right side of the transmission 10 as viewed in FIGS. 1 and 2 (which is the rear side of the car), there is displaced a shift lever 98. This shift lever 98 pivots around a spherical component 98a and can be tilted to the right or the left and, in other words, toward the front or toward the rear of the car. A protrusion 98b formed at the lower end of the shift lever 98 is provided with a link rod 100 rotatably attached thereto and swings up and down as viewed in FIG. 2. The link rod 100 is connected at its one end to a control rod 104 through a flexible joint 102. This control rod 104 is configured so as to slide toward the front or the rear of the car (the left and right as viewed in FIG. 1) by inclining the shift lever 98 toward the front or the rear of the car and turn around the shaft itself as shown in FIG. 3.

In the middle of the control rod 104, there are attached selector levers 106, 108 and 110. On the 1st–2nd gear shift rod 92 is attached a 1st–2nd gear engagement member 112 engageable with the selector lever 108. To the 3rd–4th gear shift rod 90 is similarly attached a 3rd–4th gear engagement member 114 engageable with the selector lever 108. When the control rod 104 slides to the left and right as viewed in FIG. 2 while these gear engagement members 112 and 114 engage with the selector lever 108, the 1st–2nd gear shift rod 92 and the 3rd–4th gear shift rod 90 are caused to slide in the same direction as the control rod 104. Since the 5th–6th gear shift rod 94 is separated far from the control rod 104, it is adapted to be brought into engagement with the select lever 106 through a reversal mechanism 116. The reversal mechanism 116 includes a rotational lever 120 which is mounted on a shaft 118 fixedly attached to housing 12 for rotation in a plane parallel to the axis of the control rod 104. At one end of the rotational lever 120 is formed an indentation 120a which engages the selector lever 106. The rotational lever 120 is connected at another end to the 5th–6th gear shift rod 94 so as to be freely rotatable around a pin 122 within a plane. Furthermore, with the 5th–6th gear shift rod 94, if the control rod 104 slides to the left and right within a plane of the drawing, it slides in the reverse direction to that of sliding of the control rod 104. Similarly to the 5th–6th gear shift rod 94, the reverse shift rod 96 engages the select lever 110 through the reversal mechanism 124. The reversal mechanism 124 is configured such that a rotational lever 128 is supported on the rotational shaft 126 attached to housing 12 so as to freely rotate in a plane parallel to the axis of control rod 104. The rotational lever 128 is formed at its end with a depression 128a which engages with the selector lever 110 and is connected at another end by means of pin 130 to the reverse shift rod 96 so as to freely rotate in a plane. When the control rod 104 slides to the left and right as viewed in FIG. 2, the reverse shift rod 96 slides in the opposite direction to the direction in which the control rod 104 slides.

With the transmission 10 thus constructed, the control rod 104 is turned by tilting the shift lever 98 to the left or right so as to turn the selector levers 106, 108 and 110 up and down, thereby bringing them into engagement with either one of the 3rd–4th gear shift rod 90, the 1st–2nd gear shift rod 92 and the 5th–6th gear shift rod 94 and the reverse shift rod 96. In that state, by further tilting the shift lever 98 forward or backward, the desired shift fork is moved toward the front or rear of the car and is accompanied by the movement of the corresponding coupling sleeve, so as to bring the desired gear into mechanical coupling with the output shaft 16. Thus, rotational of the input shaft 14 is transmitted to the output shaft 16 through the coupled gear.

The gear shift operation by means of the shift lever 98 will be hereafter described in detail with reference to FIG. 4 in which the shift pattern for the transmission 10 is shown and FIGS. 5 through 9 which show the select lever being brought into engagement with the shift rod.

Figure 4:
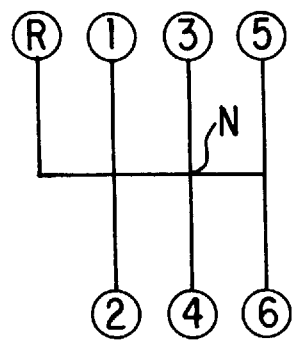
FIG. 4 is a diagram showing a shift pattern of the transmission.

Referring to FIG. 4, the shift pattern for the transmission 10 is coordinated in accordance with the number of shift rods and is lined up laterally in four rows. When the shift lever 98 is in, for instance, a neutral position N, the control rod 104 is in the position shown in FIG. 5, the selector lever 106 is out of engagement with the rotational level 120, and only the selector lever 108 is engaged with the 3rd–4th gear engagement member 114. In addition, although it is not shown in any drawings, the selector lever 110 is out of engagement with rotational lever 128. In this neutral position, all of the output gears mounted on the output shaft 16 are rotatable relative to the output shaft 16, so that rotation of the counter shaft 26 is not transmitted to the output shaft 16.

Figure 5:
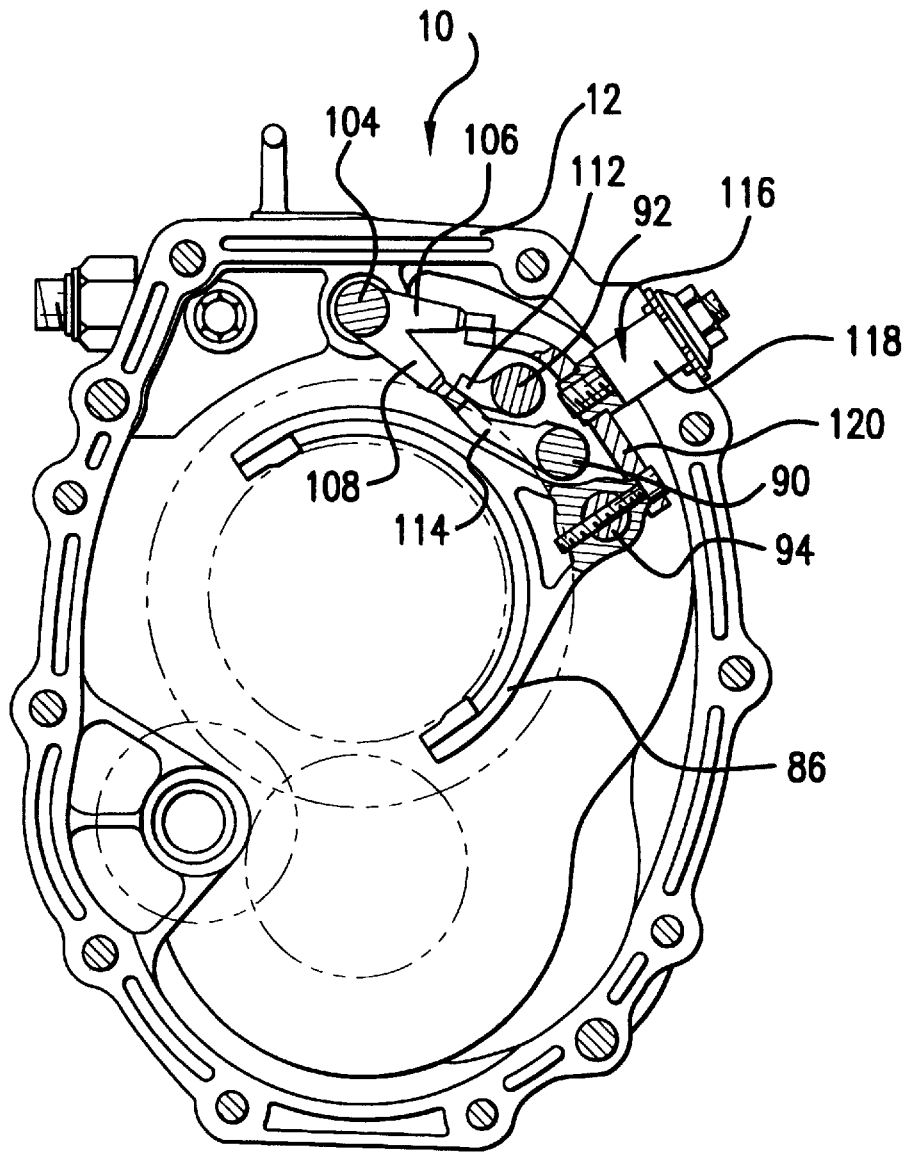
FIG. 5 is one cross-sectional view of the transmission showing one selector lever and one shift rod in an engaged state taken along line B—B in FIG. 1.
Figure 6:
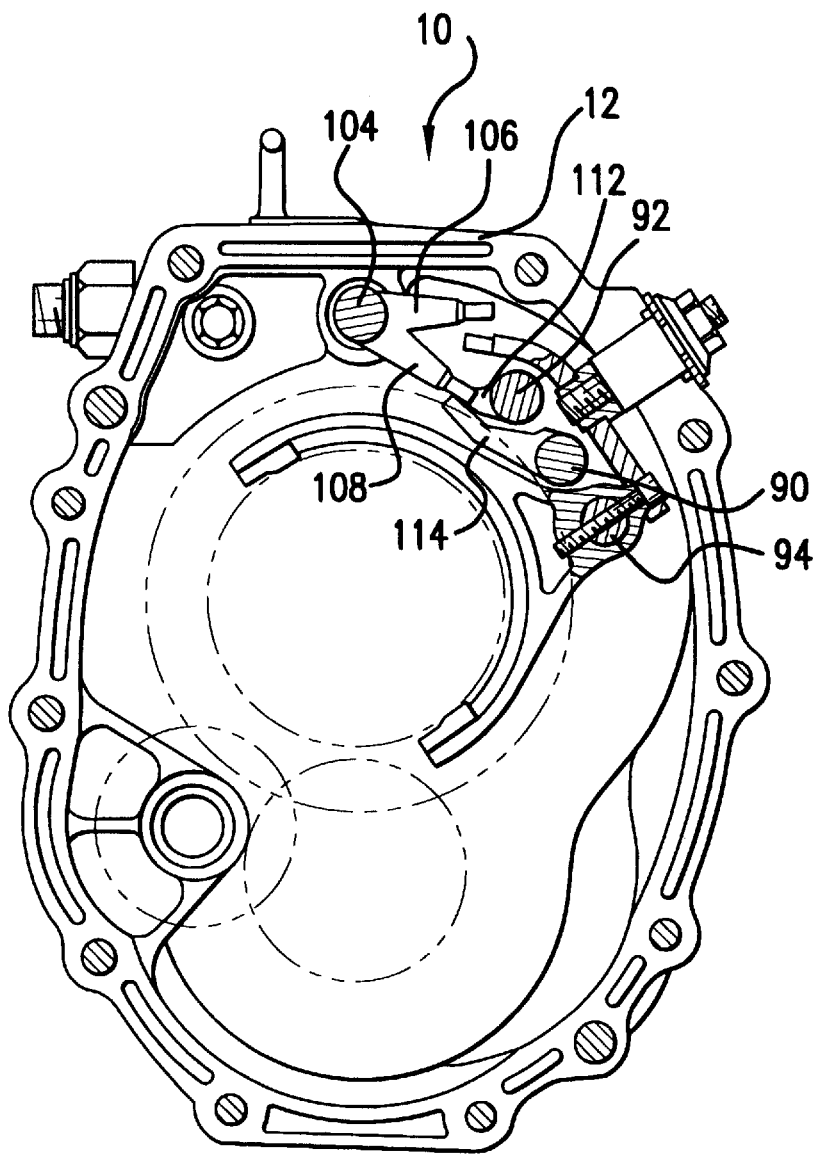
FIG. 6 is a view similar to FIG. 5 but showing the selector lever and another shift rod in an engaged state.

When the shift lever 98 is tilted by one stage of gear to the left from the neutral position, the control rod 104 is turned in the counterclockwise direction as viewed in FIG. 5, bringing the selector levers 106 and 108 into a position shown in FIG. 6. In this state, only the selector lever 108 is engaged with the 1st–2nd gear engagement member 112, and the selector levers 106 and 110 are not engaged with the rotational levers 120 and 128, respectively. When the shift lever 98 is further tilted toward the front from this state, since the 1st–2nd gear engagement component 112 is pushed toward the rear by means of the selector lever 108, the 1st–2nd gear shift rod 92 slides toward the rear of the car. By this, the 1st–2nd gear shift fork 84 which is attached to the 1st–2nd gear shift rod 92 moves the coupling sleeve 76a of the 1st–2nd gear synchronizer 76 toward the rear of the car, and the first output gear 52 is fixedly coupled to the output shaft 16. In this state, rotation of the counter shaft 26 is transmitted to the output shaft 16 through the engagement of the 1st counter gear 40 with the 1st output gear 52, forming the first (1st) gear.

When the shift lever 98 is tilted one gear step to the left from the neutral position and then toward the rear of the car, the 1st–2nd gear engagement member 112 is pushed forward by the selector lever 108, so that the 1st–2nd shift rod 92 is slid toward the front of the vehicle. As a result, the 1st–2nd gear shift fork 84 attached to the 1st–2nd shift rod 92 moves the coupling sleeve 76a of the 1st–2nd gear synchronizer 76 toward the front of the car, and the second (2nd) output gear 50 is brought into fixed coupling with the output shaft 16. In this state, rotation of the counter shaft 26 is transmitted to the output shaft 16 through the engagement of the second (2nd) counter gear 38 and the second (2nd) output gear 55, thus forming the second (2nd) gear.

Further, when the gear shift lever 98 is returned to the neutral position N, then, the select levers 106 and 108 return to the positions shown in FIG. 5, and only selector lever 8 is brought into engagement with the 3rd–4th gear engagement member 114. From this neutral position, when the shift lever 98 is tilted forward, then the 3rd–4th gear engagement member 114 is pushed toward the back of the car by means of the shift lever 108, and the 3rd–4th gear shift rod 90 slides toward the rear of the car. As a result, the 3rd–4th gear shift fork 82, attached to the 3rd–4th gear shift rod 90, forces the coupling sleeve 74a of the 3rd–4th synchronizer 74 toward the rear of the car, so as to fixedly couple the 3rd counter gear 48 to the output shaft 16. In this state, rotation of the counter shaft 26 is transmitted to the output shaft 16 through the 3rd output gear 48 and the 3rd counter gear 36, thus forming the 3rd gear.

When the shift lever 98 is tilted toward the rear from the neutral position, since the 3rd–4th gear engagement member 114 is pushed toward the front by the selection lever 108, the 3rd–4th gear shift rod 90 is slid toward the front of the car. By this, the 3rd–4th gear shift fork 82 attached to the 3rd–4th shift rod 90 moves the coupling sleeve 74a of the 3rd–4th gear synchronizer 74 toward the front of the car, so that the output shaft 16 is directly connected to the input shaft 14. This forms the 4th gear.

Figure 7:
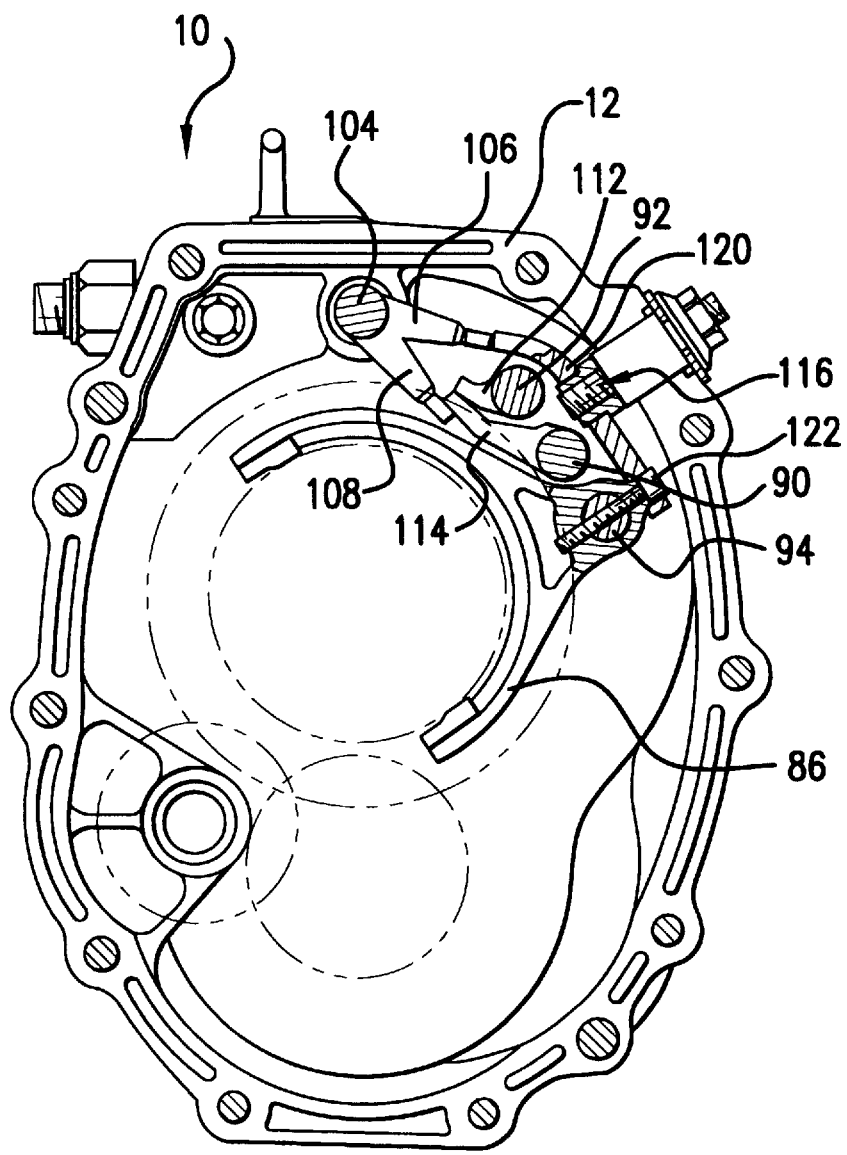
FIG. 7 is a view similar to FIG. 5 but showing another selector lever and a reversal mechanism in an engaged state.

When the shift lever 98 is tilted one gear step to the right from the neutral position, the control rod 104 is turned in the clockwise direction as viewed in FIG. 5, the selector levers 106 and 108 change to the position shown in FIG. 7. In this state, only the selector lever 106 is engaged with the rotational lever 120, and the selection lever 108 is not in engagement with the 1st–2nd gear engagement member 112 nor the 3rd–4th gear engagement member 114. In addition, the selector lever 110 is also not in engagement with the rotational lever 128. From this state, if the shift lever 98 is tilted toward the front of car, since the end of the rotational lever 120 is pushed toward the rear by the selection lever 110, then the 5th–6th gear shift rod 94 is slid toward the front of the car. By this, the 5th–6th gear shift fork 86 attached to the 5th–6th gear shift rod 94 moves the coupling sleeve 78a of the 5th–6th gear synchronizer 78 toward the front of the car, the 5th output gear 54 is engaged with the output shaft 16. In this state, rotation of the counter shaft 26 is transmitted to the output shaft 16 through the 5th counter gear 42 and the 5th output gear 54. This forms the 5th gear.

When the shift lever 98 is tilted one gear step to the right from the neutral position, it is tilted toward the rear of the car. Therefore, since the end of the rotational lever 120 is pushed toward the front by means of the selector lever 110, the 5th–6th shift rod 94 slides toward the rear of the vehicle. By this, the 5th–6th shift fork 86 which is attached to the 5th–6th gear shift rod 94 is such that the coupling sleeve 78a of the 5th–6th synchronizer 78 moves toward the rear of the vehicle. In this state, rotation of the counter shaft 26 is transmitted to the output shaft 16 through the engagement between the 6th counter gear 44 and the 6th output gear 56, thus forming the state of 6th gear.

Figure 8:
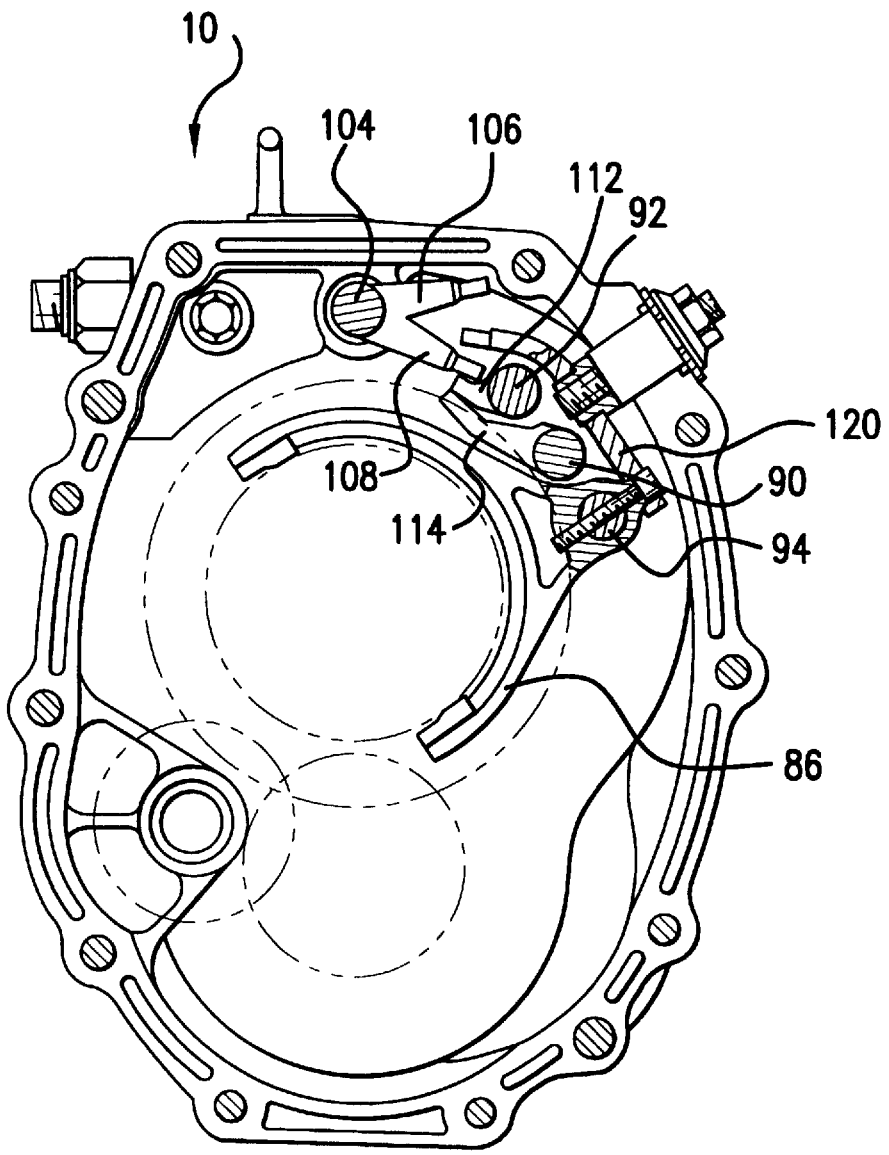
FIG. 8 is a view similar to FIG. 5 but showing selector levers in disengaged states.
Figure 9:
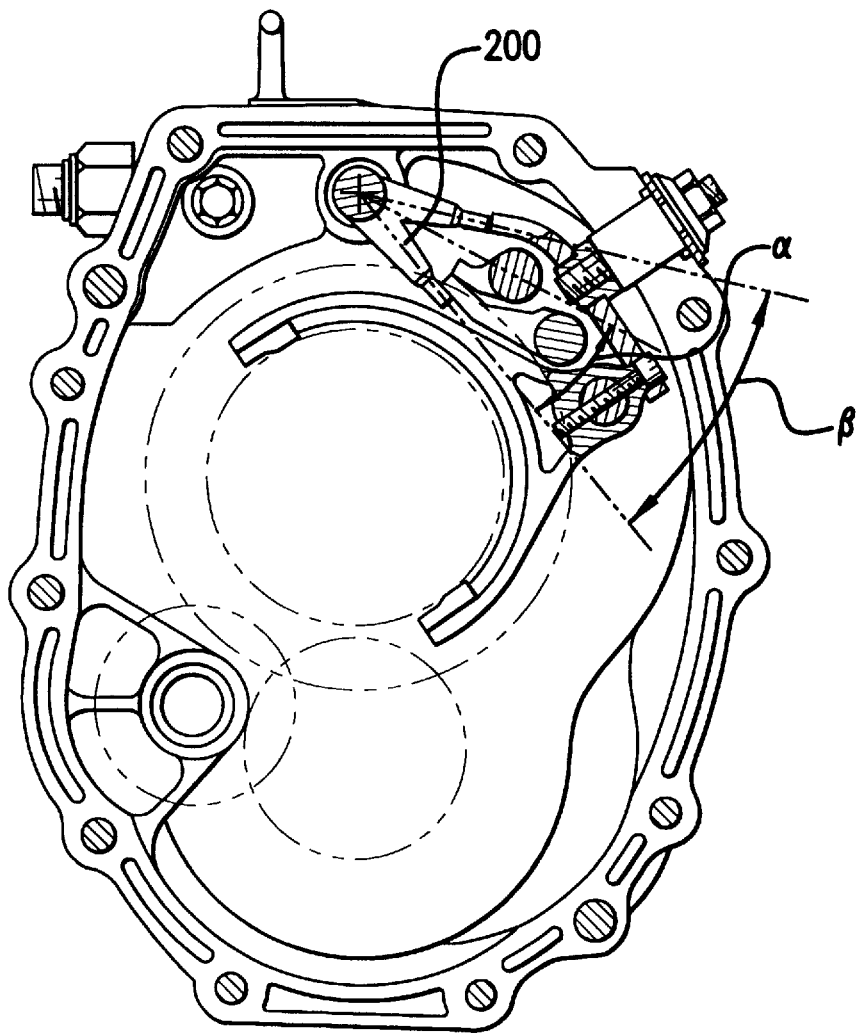
FIG. 9 is a view for a comparison of rotational angle between prior art selector levers and the selector levers of this invention.

If the transmission lever 98 is tilted two gear steps to the left from the neutral position, the control rod 104 is turned in the counterclockwise direction as viewed in FIG. 5, and the selector levers 106 and 108 are brought to the position shown in FIG. 8. In this state, the selector levers 106 and 108 are not engaged with any of the shift rod engagement members or the rotational levers. Only the selection lever 110 is engaged with the rotational lever 128 as shown in FIG. 2. If the transmission lever 98 is tilted toward the front of the vehicle from this state, since the end of the rotational lever 128 is pushed toward the rear, the shift rod 96 is slid toward the front of the vehicle. By this, the reverse shift fork 88 attached to the reverse shift rod 96 moves the coupling sleeve 80a of the reverse synchronizer 80 toward the front of the vehicle, engaging the reverse gear 58 with the output shaft 16. In this state, rotation of the counter shaft 26 is transmitted to the output shaft 16 through the engagement between the reverse counter gear 46, the idle gear 72 and the reverse output gear 58. This comprises the state of reverse gear.

In this instance, as shown in FIG. 5, selector levers 106 and 108 are displaced so that they are offset a specified angle around the central axis of the control rod 104. In other words, the two selector levers are positioned so that they are offset a specified amount around the axis of the control rod 104. For example, if substitution is made with the single selection lever 200 like the prior art shown in FIG. 9, then, when shifting into the 1st gear to the 6th gear, or into the reverse gear, the selector lever 200 must move over an angle β shown in FIG. 9. In this regard, by means of the arrangement of the two selector levers 106 and 108 offset around the axis of the control rod 104, the rotation of the control rod 104 is accomplished by an angle α, which is smaller than the angle β as understood from FIGS. 5 through 9. Furthermore, with this embodiment, since the rotative angle of the control rod is decreased, the amount of lateral movement of the shift lever 98 is reduced, enabling quick gear changes. In addition, greater flexibility is also afforded with regard to the layout of the shift rods.

As described above, because the reverse shift rod is displaced behind the 5th–6th gear shift rod, the width of the transmission is decreased, decreasing the overall size of the transmission. In addition, because the two selector levers are offset around the axis of the control rod above the control rod, the rotative angle of the control rod is reduced, affording a high degree of flexibility in terms of the layout of shift rods.

Although the above description has been provided with regard to the configuration of two select levers for shifting through the 1st gear to 6th gear, nevertheless, more than three select levers may be provided.

It is to be understood that although the present invention has been described in detail with respect to a preferred embodiment thereof, various other embodiments and variants may occur to those skilled in the art, which fall within the scope and spirit of the invention. Such other embodiments and variants are intended to be covered by the following claims.

What is claimed is:

1. A gear shift mechanism having a shift lever for placing a manual transmission into any one of a plurality of gears comprising:

torque transmission shaft means for supporting a number of transmission gears, said torque transmission shaft means comprising a torque input shaft and a torque output shaft coaxially aligned with each other for torque transmission;

a control rod disposed in parallel with said torque transmission shaft means, said control rod being formed with first and second selector levers axially separated from each other and being axially shifted and rotated by a gear shift lever;

a first shift rod disposed in parallel with said torque transmission shaft means, said first shift rod being provided with a shift fork engageable with said first selector lever for selection of one of said plurality of gears; and a second shift rod disposed in parallel with said torque transmission shaft means, said second shift rod being provided with a shift fork engageable with said second selector lever for selection of another one of said plurality of gears.

2. A gear shift mechanism as defined in claim 1, wherein said shift rods are coaxially disposed.

3. A gear shift mechanism as defined in claim 1, wherein said selector levers are disposed on said control rod and axially spaced along an axis of rotation of said control rod.

4. A gear shift mechanism as defined in claim 1, wherein said selector levers are disposed on said control rod and angularly spaced relative to an axis of rotation of said control rod.

5. A gear shift mechanism as defined in claim 1, wherein one of said selector levers is engageable with one of said shift rods which selects a reverse gear.

6. A gear shift mechanism as defined in claim 5, wherein said one of said shift rods which selects said reverse gear is disposed away from an input end of the manual transmission and the other of said shift rods is for selecting a forward gear and is juxtaposed in proximity to said input end of the manual transmission.

7. A gear shift mechanism as defined in claim 1, wherein the first shift rod selects a forward gear and the second shift rod selects a reverse gear.

8. A gear shift mechanism as defined in claim 1, wherein said shift rods and said control rod are arranged parallel to each other.

9. A gear shift mechanism as defined in claim 1, wherein one of said shift rods is disposed away from an input end of the manual transmission and the other of said shift rods is juxtaposed in proximity to said input end of the manual transmission.

10. A gear shift mechanism having a shift lever for placing a manual transmission into any one of a plurality of gears comprising:

a plurality of shift rods for selecting the plurality of gears, each of which is provided with a shift fork; and a control rod having at least two selector levers one of which is engageable with at least a specific one of said shift rods which selects a forward gear and another one of which is engageable with another of said shift rods which selects another forward gear;

wherein one of said selector levers is engageable with one of said shift rods which selects a reverse gear and said one of said shift rods which selects said reverse gear is disposed coaxially with one of said shift rods which selects said forward gears.

11. A gear shift mechanism as defined in claim 10, wherein one of said shift rods selects a reverse gear and is disposed away from an input end of the manual transmission and the rest of said shift rods select said forward gears and are juxtaposed in proximity to said input end of the manual transmission.

12. A gear shift mechanism as defined in claim 10, wherein at least two of said shift rods are coaxially disposed.

13. A gear shift mechanism as defined in claim 10, wherein said selector levers are disposed on said control rod and axially spaced along an axis of rotation of said control rod.

14. A gear shift mechanism as defined in claim 10, wherein said selector levers are disposed on said control rod and angularly spaced relative to an axis of rotation of said control rod.

15. A gear shift mechanism as defined in claim 10, wherein said shift rods and said control rod are arranged parallel to each other.

16. A gear shift mechanism as defined in claim 10, wherein one of said shift rods is disposed away from an input end of the manual transmission and the rest of said shift rods are juxtaposed in proximity to said input end of the manual transmission.

* * * * *